(No Model.)

W. C. SCOFIELD.
PARAFFINE FREEZER.

No. 299,860. Patented June 3, 1884.

WITNESSES

INVENTOR
Wm C. Scofield
by
Leggett & Leggett
Attorneys

UNITED STATES PATENT OFFICE.

WILLIAM C. SCOFIELD, OF CLEVELAND, OHIO.

PARAFFINE-FREEZER.

SPECIFICATION forming part of Letters Patent No. 299,860, dated June 3, 1884.

Application filed March 17, 1884. (No model.)

*To all whom it may concern:*

Be it known that I, WILLIAM C. SCOFIELD, of Cleveland, in the county of Cuyahoga and State of Ohio, have invented certain new and useful Improvements in Paraffine-Freezers; and I do hereby declare the following to be a full, clear, and exact description of the invention, such as will enable others skilled in the art to which it pertains to make and use the same.

My invention relates to an apparatus for freezing paraffine, the object being to provide a metal disk kept at a low temperature, and upon which liquid paraffine is automatically sprinkled and automatically removed after it is frozen by contact with the disk, and so arranged that the process is continuous.

With these objects in view my invention consists in certain features of construction and in combination of parts, hereinafter described, and pointed out in the claims.

Figure 1:
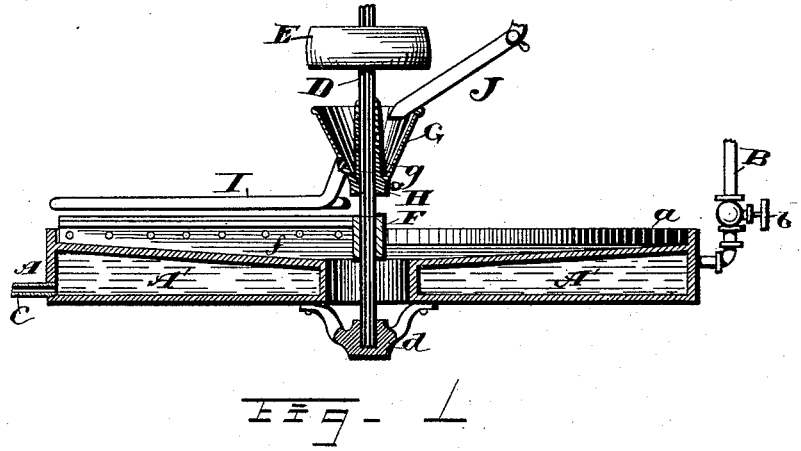
Figure 2:
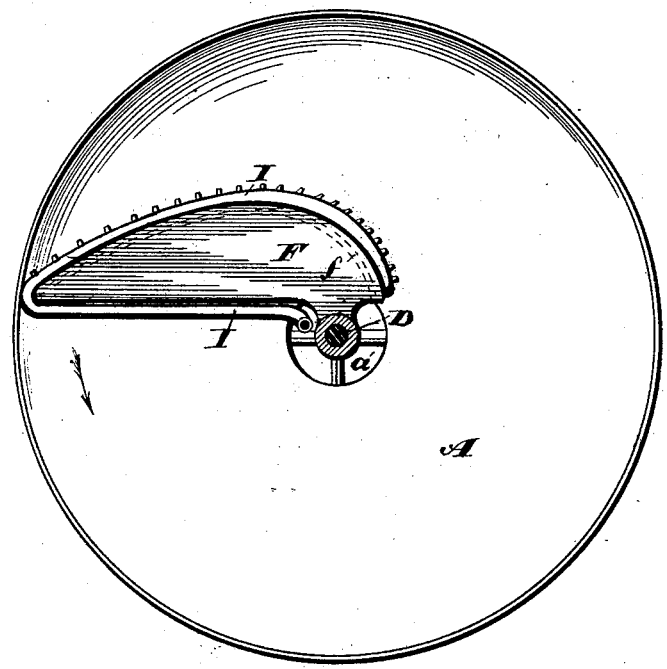

In the accompanying drawings, Figure 1 is a vertical section through the center of the freezing-disk, with certain details in elevation. Fig. 2 is a plan view of the same.

A represents a hollow disk with a large vertical central opening, *a'*. The upper surface is slightly concave, and is provided at the periphery with an upwardly-projecting rim, *a*. A feed-pipe, B, leads to the chamber A' of the disk, and is provided with a valve, *b*, and a discharge-pipe, C, leading from the said chamber. By means of this pipe the chamber of the disk is supplied with some cooling-liquid and its flow through the chamber regulated, so that the disk is kept at the desired low temperature.

D is the driving-shaft, supported below preferably by the box and stepping *d*, secured to the bottom of the disk, and above in any suitable manner, and is provided with the driving-pulley E.

F is an arm attached to the shaft and preferably curved on the back, as shown, and to which is attached the curved scraper *f*, that fits the surface of the disk, and at the inner end is at a tangent with the central opening of the disk.

G is a large funnel provided with the vertical sleeve *g*, that embraces the shaft. The funnel rests upon the collar H, secured to the shaft with a set-screw, by means of which the funnel may be adjusted vertically.

I is a tube leading from the bottom of the funnel to near the outer edge of the disk, and then curving back behind the line of the scraper, as shown, and perforated so as to discharge the paraffine upon the disk just back of the scraper. The perforations are more numerous near the outside of the disk in proportion to the large area to be covered, and the outer perforations, being first to receive the liquid, are always filled. As the sprinkling-tube revolves just back of the scraper, the paraffine sprinkled therefrom remains on the disk during almost a revolution of the shaft, and by regulating the temperature of the disk and the speed of the shaft, and the flow of the paraffine through the pipe J, the paraffine is continuously supplied to the disk, frozen, and discharged therefrom. The perforated portion of the sprinkling-pipe should be adjusted so near the disk that the paraffine will not be spattered over the edges, and the fall from the funnel should be sufficient to force the paraffine freely through the jet-orifices. A straight arm and scraper may be used, but will not remove the material from the outside of the disk so well as the curved arm; also, the rim *a* might be omitted, and by revolving the arm in the opposite direction to that shown by the arrow the paraffine would be discharged at the periphery of the disk, but would not be so convenient as to have the material discharged in a body at the center.

What I claim is—

1. A hollow disk provided with pipes to supply cooling-liquid to the chamber in the disk, and provided with suitable means for sprinkling liquid paraffine on the disk and automatically removing it when it is frozen, substantially as set forth.

2. A hollow disk provided with tubes for supplying liquid to the chamber thereof, and with the upper surface concaved and provided with an upwardly-projecting rim, and a vertical central opening through the disk, substantially as set forth.

3. In combination with a hollow disk arranged as aforesaid, a vertical shaft located at the axis of the disk, and provided with an arm and scraper, preferably curved, as shown, and adapted to remove the frozen paraffine from the disk, substantially as set forth.

4. In combination with a hollow disk arranged as aforesaid, a vertical shaft and an arm and scraper, preferably curved, and adapted to scrape the frozen paraffine from the disk and discharge it through the central opening thereof, substantially as set forth.

5. In a paraffine-freezer, in combination with the hollow disk and revolving vertical shaft, as aforesaid, an adjustable funnel provided with a central sleeve embracing the shaft, and a tube to supply liquid paraffine to the funnel, and a sprinkling-pipe leading from the funnel to near the periphery of the disk, and from thence curved back of the scraper and perforated, so as to discharge the paraffine just back of the scraper, substantially as set forth.

In testimony whereof I sign this specification, in the presence of two witnesses, this 11th day of March, 1884.

WILLIAM C. SCOFIELD.

Witnesses:
CHAS. H. DORER,
ALBERT E. LYNCH.